United States Patent

[11] 3,571,673

[72] Inventors Stanford R. Ovshinsky
Bloomfield Hills;
Gordon R. Fleming, Pontiac, Mich.
[21] Appl. No. 754,533
[22] Filed Aug. 22, 1968
[45] Patented Mar. 23, 1971
[73] Assignee Energy Conversion Devices, Inc.
Troy, Mich.

[54] CURRENT CONTROLLING DEVICE
14 Claims, 7 Drawing Figs.

[52] U.S. Cl. .......... 317/234, 307/324, 252/62.3
[51] Int. Cl. .......... H01l 9/00
[50] Field of Search .......... 317/234, 235, 10, 25, 48.3, 48.7; 338/20; 252/62.3 (g), 62.3(III), 62.3 (C)

[56] References Cited

UNITED STATES PATENTS

| | | | |
|---|---|---|---|
| 3,370,208 | 2/1968 | Mizushima et al. | 317/235 |
| 3,409,400 | 11/1968 | Bither et al. | 317/235 |

FOREIGN PATENTS

| | | | |
|---|---|---|---|
| 1,108,274 | 4/1968 | Great Britain | 317/235 |
| 1,213,076 | 4/1966 | Germany | 317/234 |

*Primary Examiner*—Jerry D. Craig
*Attorney*—Wallenstein, Spangenberg, Hattis and Strampel

ABSTRACT: A current controlling device for an electrical circuit including a semiconductor material and electrodes in low electrical resistance contact therewith, wherein said semiconductor material has a high electrical resistance to provide a blocking condition for substantially blocking current therethrough, wherein the high electrical resistance is substantially instantaneously decreased to a low electrical resistance in response to a voltage above a threshold voltage value, wherein the semiconductor material in the low electrical resistance conducting condition has a voltage drop which is a fraction of the voltage drop in the high electrical resistance blocking condition near the threshold voltage value, and wherein the semiconductor material is a multielement nonchalcogenide material including as essential ingredients arsenic or phosphorous and silicon, germanium, gallium, boron or aluminum. The material may also include minor additions, such as, cadmium or zinc. Particularly good results have been obtained with a binary system of arsenic and silicon.

PATENTED MAR 23 1971 3,571,673
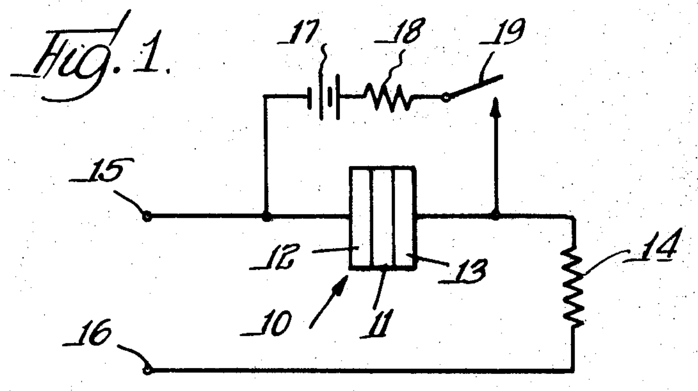
Fig. 1.
Fig. 2. Fig. 3. Fig. 4
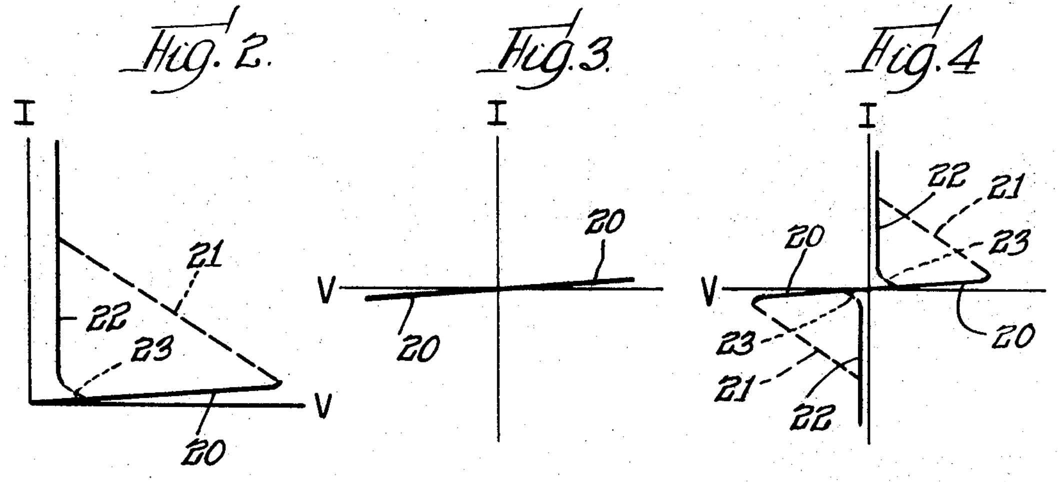
Fig. 2. Fig. 3. Fig. 4
Fig. 5. Fig. 6. Fig. 7.
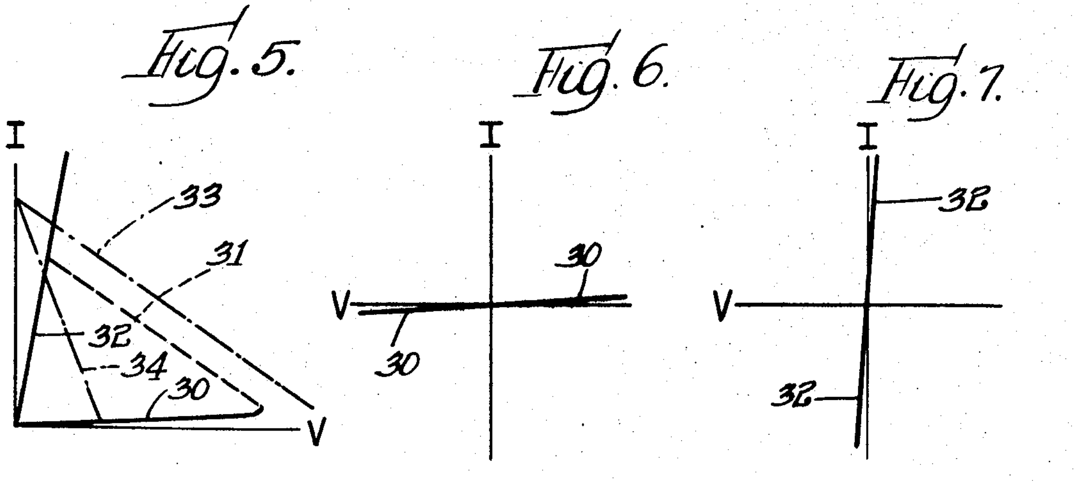
Fig. 5. Fig. 6. Fig. 7.
Inventors
Gordon R. Fleming
Stanford R. Ovshinsky
By Wallenstein, Spangenberg, Hattis & Strampel attys

CURRENT CONTROLLING DEVICE

The invention of this application is related to and is an improvement upon the invention disclosed in Stanford R. Ovshinsky U.S. Pat. No. 3,271,591 issued Sept. 6, 1966. That patent discloses two basic types of current controlling devices, a nonmemory-type device (referred to therein as a "-Mechanism" device) and a memory type device (referred to therein as "Hi-Lo" and "Circuit Breaker" devices). Both the nonmemory- and memory-type devices are changed from their blocking condition to their conducting condition by applying a voltage above a voltage value. The nonmemory-type device requires a holding current to maintain it in its conducting condition and it immediately returns to its blocking condition when the current decreases below a minimum current holding value. The memory type device requires no holding current, it remaining in its conducting condition even through the current is removed or reversed, and it is returned to its blocking condition by a current pulse of at least a threshold current value. The invention herein is applicable to both types of current controlling devices.

In the current controlling devices of this invention, the semiconductor materials which are engaged by the electrodes comprise multielement nonchalcogenide materials, i.e., materials not containing Group VIA elements, such as oxygen, sulfur selenium, tellurium or polonium. The semiconductor material have or tend to have a polymeric structure, whether they be crystalline or amorphous in nature, this being occasioned by the fact that at least some of the elements of the semiconductor materials are polymer forming elements, as for example, arsenic, phosphorous, silicon, germanium and boron. These polymeric elements and, also, gallium and aluminum are particularly useful in the semiconductor materials since they effectively form covalent bonds in a polymeric structure to provide or tend to provide short range order in the semiconductor material.

Basically, the semiconductor materials include as essential ingredients arsenic or phosphorous and silicon, germanium, gallium, boron or aluminum. For two element semiconductor materials, exceptionally fine results have been obtained by combining germanium and arsenic (Ge $As_2$) or silicon and arsenic (Si $As_2$) in substantially stochiometric amounts, such semiconductor materials providing the above mentioned nonmemory type of switching. It has been found that by varying the stochiometric relations and adding minor amounts of other ingredients, such as, cadmium or zinc, to the semiconductor materials fine results are also obtained, such semiconductor materials operating as nonmemory type devices or memory type devices depending upon the relative proportions of the elements in the semiconductor materials.

The semiconductor materials in their blocking condition are substantially disordered to provide short range order, large numbers of current carrier restraining centers, such as traps, recombination centers or the like, a substantial barrier layer, and high blocking resistances. In this respect, the substantially disordered semiconductor material may be generally amorphous or polycrystalline in structure, the short range order, large numbers of current carrier restraining centers, high resistance and barrier layer throughout the semiconductor materials being assured by the generally amorphous structure or by the relationships between the crystals in the polycrystalline structure. When a voltage of at least a threshold voltage value is applied to the electrodes of the current controlling devices, at least one path of low resistance is substantially instantaneously provided through the semiconductor materials between the electrodes to provide a conducting condition for conducting current therethrough. Briefly, in this respect, the applied voltage operates to produce and release free current carriers and cause the barrier layer to become vanishingly thin. Again, briefly, in the nonmemory-type devices, said at least one path through the semiconductor materials remain in their substantially disordered condition when switched to their conducting condition, and revert to their blocking condition when the current therethrough decreases below a minimum current holding value, the current carriers being restrained (trapped or recombined or the like) by the current carrier restraining centers and the barrier layer being reestablished. However, when the memory type devices are switched to their conducting condition said at least one path through the semiconductor materials between the electrodes are altered to a more ordered crystalline or pseudo crystallinelike condition having a relatively long range order and vanishingly thin barrier layer which remain even though the current is reduced to zero or reversed. When the current pulse is applied to switch the memory type device back to its blocking condition, the more ordered crystallinelike condition of said at least one path in the semiconductor materials is broken up and returned to the substantially disordered condition with the result that the short range order is restored, the current carriers restrained (trapped or recombined or the like), and the barrier layer reestablished.

The arsenic or phosphorous included in the multielement semiconductor materials breaks up the long range order and produces the short range or local order therein to provide the blocking condition therein for making possible the nonmemory and memory type operations discussed above. An increase in the amount of arsenic or phosphorous in the semiconductor materials tends to provide nonmemory-type operation and a decrease tends to provide memory type operation.

Generally speaking, the use of nonchalcogenide semiconductor materials as specified herein produces improved results over the use of chalcogenide materials in that such materials, among other things, appear to be more stable as to their threshold voltage values, appear to operate better at higher temperatures, and appear to be less dependent upon ambient temperature conditions. The semiconductor materials which are engaged by the electrodes may be in the form of thick bodies or they may be in the form of thin layers or films.

Other objects and advantages of this invention will become apparent to those skilled in the art upon reference to the accompanying specification, claims and drawing in which:

FIG. 1 is a diagrammatic illustration of the current controlling device of this invention connected in series in a load circuit;

FIG. 2 is a voltage current curve illustrating the operation of the nonmemory-type current controlling device of this invention in a DC load circuit;

FIGS. 3 and 4 are voltage current curves illustrating the symmetrical operation of the nonmemory-type current controlling device and the operation thereof when included in an AC load circuit;

FIG. 5 is a voltage current curve illustrating the operation of the memory type current controlling device of this invention in a DC load circuit; and FIGS. 6 and 7 are voltage current curves illustrating the symmetrical operation of the memory-type current controlling device and the operation thereof when included in an AC load circuit.

Referring now to the diagrammatic illustration of FIG. 1, the current controlling device of this invention is generally designated at 10. It includes a nonchalcogenide semiconductor material 11 which is of one conductivity type and which is of high electrical resistance and a pair of electrodes 12 and 13 in contact with the semiconductor material 11 and having a low electrical resistance of transition therewith. The electrodes 12 and 13 of the current controlling device 10 connect the same in series in an electrical load circuit having a load 14 and a pair of terminals 15 and 16 for applying power thereto. The power supplied may be a DC voltage or an AC voltage as desired. The circuit arrangement illustrated in FIG. 1, and as so far described, is applicable for the nonmemory-type of current controlling device. If a memory type of current controlling device is utilized, the circuit also includes a source of current 17, a low resistance 18 and a switch 19 connected to the electrodes 12 and 13 of the current controlling device. The purpose of this auxiliary circuit is to switch the memory type device from its conducting condition to its blocking condition. The resistance value of the resistance 18 is considerably less than the resistance value of the load 14.

FIG. 2 is an I–V curve illustrating the DC operation of the nonmemory-type current controlling device 10 and in this instance the switch 19 always remains open. The device 10 is normally in its high resistance blocking condition and as the DC voltage is applied to the terminals 15 and 16 and increased, the voltage current characteristics of the device are illustrated by the curve 20, the electrical resistance of the device being high and substantially blocking the current flow therethrough. When the voltage is increased to a threshold voltage value, the high electrical resistance in the semiconductor material substantially instantaneously decreases in at least one path between the electrodes 12 and 13 to a low electrical resistance, the substantially instantaneous switching being indicated by the curve 21. This provides a low electrical resistance or conducting condition for conducting current therethrough. The low electrical resistance is many orders of magnitude less than the high electrical resistance. The conducting condition is illustrated by the curve 22 and it is noted that there is a substantially linear voltage current characteristic and a substantially constant voltage characteristic which are the same for increase and decrease in current. In other words, current is conducted at a substantially constant voltage. In the low resistance current conducting condition the semiconductor element has a voltage drop which is a minor fraction of the voltage drop in the high resistance blocking condition near the threshold voltage value.

As the voltage is decreased, the current decreases along the curve 22 and when the current decreases below a minimum current holding value, the low electrical resistance of said at least one path immediately returns to the high electrical resistance as illustrated by the curve 23 to reestablish the high resistance blocking condition. In other words, a current is required to maintain the nonmemory-type current controlling device in its conducting condition and when the current falls below a minimum current holding value, the low electrical resistance immediately returns to the high electrical resistance.

The nonmemory current controlling device 10 of this invention is symmetrical in its operation, it blocking current substantially equally in each direction and it conducting current substantially equally in each direction, and the switching between the blocking and conducting conditions being extremely rapid. In the case of AC operation, the voltage current characteristics for the second half cycle of the AC current would be in the opposite quadrant from that illustrated in FIG. 2. The AC operation of the device is illustrated in FIGS. 3 and 4. FIG. 3 illustrates the device 10 in its blocking condition where the peak voltage of the AC voltage is below the threshold voltage value of the device, the blocking condition being illustrated by the curve 20 in both half cycles. When, however, the peak voltage of the applied AC voltage increases above the threshold voltage value of the device, the device is substantially instantaneously switched along the curve 21 to the conducting condition illustrated by the curves 22, the device switching during each half cycle of the applied AC voltage. As the applied AC voltage nears zero so that the current through the device falls below the minimum current holding value, the device switches along the curves 23 from the low electrical resistance condition to the high electrical resistance condition illustrated by the curve 20, this switching occurring near the end of each half cycle.

For a given configuration of the nonmemory device 10, the high electrical resistance may be about 1 megohm and the low electrical resistance about 10 ohms, the threshold voltage value may be about 20 volts and the voltage drop across the device in the conducting condition may be less than 1 volt, and the switching times may be in nanoseconds or less. As expressed above, there is no substantial change in phase or physical structure of the nonmemory-type semiconductor material as it is switched between the blocking and conducting conditions, and where the semiconductor material is substantially disordered and generally amorphous, said at least one conducting path through the semiconductor material is also substantially disordered and generally amorphous in the conducting condition. Where the semiconductor material is substantially disordered and generally crystalline or polycrystalline or the like, in the manner of having local chemical bonds similar to those of the substantially disordered and generally amorphous semiconductor material, neither is there any substantial change in phase or crystal or polycrystalline structure.

FIG. 5 is an I–V curve illustrating the DC operation of the memory type current controlling device 10. The device is normally in its high resistance condition and as the DC voltage is applied to the terminals 15 and 16 and increased, the voltage current characteristics of the device are illustrated by the curve 30, the electrical resistance of the device being high and substantially blocking the current flow therethrough. When the voltage is increased to a threshold voltage value, the high electrical resistance in the semiconductor material 11 substantially instantaneously decreases in at least one path between the electrodes 12 and 13 to a low electrical resistance, the substantially instantaneous switching being indicated by the curve 31. The low electrical resistance is many orders of magnitude less than the high electrical resistance. The conducting condition is illustrated by the curve 32 and it is noted that there is a substantially ohmic voltage-current characteristic. In other words, current is conducted substantially ohmically as illustrated by the curve 32. In the low resistance current conducting condition the semiconductor material has a voltage drop which is a minor fraction of the voltage drop in the high resistance blocking condition near the threshold voltage value.

As the voltage is decreased, the current decreases along the curve 32 and due to the ohmic relation the current decreases to zero as the voltage decreases to zero. The memory-type current controlling device has memory of its conducting condition and will remain in this conducting condition even though the current is decreased to zero or reversed until switched to its blocking condition as hereafter described. The load line of the load circuit is illustrated at 33, it being substantially parallel to the switching curve 31. When a DC current pulse is applied independently of the load circuit to the memory-type device as by the voltage source 17, low resistance 18 and switch 19 in FIG. 1, the load line for such current is along the line 34 since there is very little, if any, resistance in this control circuit, and as the load line 34 intersects the curve 30, the conducting condition of the device is immediately realtered and switched to its blocking condition. The memory-type device will remain in its blocking condition until switched to its conducting condition by the reapplication of a threshold voltage to the device through the terminals 15 and 16.

The memory-type current controlling device 10 of this invention is also symmetrical in its operation, it blocking current substantially equally in each direction and it conducting current substantially equally in each direction, and the switching between the blocking and conducting conditions being extremely rapid. In the case of AC operation, the voltage current characteristics for the second half cycle of the AC current would be in the opposite quadrant from that illustrated in FIG. 5. The AC operation of the memory-type device is illustrated in FIGS. 6 and 7. FIG. 6 illustrates the device 10 in its blocking condition where the peak voltage of the AC voltage is below the threshold voltage value of the device, the blocking condition being illustrated by the curve 30 in both half cycles. Thus, the device blocks current substantially equally in both half cycles. When, however, the peak voltage of the applied AC voltage increases above the threshold voltage value of the memory-type device, the device substantially instantaneously switches to the conducting condition illustrated by the curve 32 in FIG. 7 and it remains in this conducting condition regardless of the reduction of the current to zero or the reversal of the current. This symmetrical conducting condition is illustrated by the curve 32 in FIG. 7.

When the switch 19 is manipulated and the voltage applied to the terminals 15 and 16 is below the threshold voltage value, the current pulse causes the memory-type current controlling device to be immediately switched to its blocking condition as illustrated by the curve 30 in FIG. 6. For a given configuration of the memory-type device, the high electrical resistance may be about 1 megohm and the low electrical resistance about 10 ohms, the threshold voltage value may be about 20 volts and the switching times are extremely rapid. As expressed above, the semiconductor material is substantially disordered and generally amorphous or polycrystalline or the like in its blocking condition and said at least one conducting path through the element in its conducting condition is more ordered and generally crystalline or pseudo crystalline, there being a change of phase of physical structure in the material between the blocking condition and the conducting condition.

The foregoing operations of the nonmemory device and the memory device are like those disclosed in the aforementioned patent and, therefore, a further description thereof is not considered necessary here.

Considering first the binary system of silicon and arsenic, switching in the nonmemory-type manner as described above occurs at or near the stochiometric points of $SiAs_2$ and $SiAs$ and in the regions there between. The atomic percent of arsenic is therefore between about 662/3 percent and 50 percent with respect to silicon. Small additions of additional elements may be included in the aforementioned system to provide a ternary system or the like. Such small additions may include, for example, arsenides of cadmium and such small additions are preferably in the range of 0 percent to about 20 percent in atomic weight percent of the ternary system. In such binary or ternary systems, switching in the nomemory-type manner also occurs where the compositions are richer in arsenic. However, where such systems contain less arsenic the switching is accomplished in the memory-type manner ad described above. Thus, the type of switching, whether it be nonmemory-type or memory type, may be predetermined as desired by appropriately selecting the proportion of the arsenic included in the semiconductor material composition.

As expressed above, the semiconductor material is a polymeric material, which utilizes polymer forming elements, and which provides the aforementioned electrical and switching characteristics. Among other things, the arsenic in the semiconductor material provides and tends to provide the aforementioned short range order with its intendent advantages, the more the arsenic the more is the tendency to maintain the short range order. Thus, with increased arsenic in the composition there is a strong tendency to maintain the semiconductor material in its substantially disordered and short range order condition even in the conducting condition to provide the aforementioned nonmemory-type operation. On the other hand, with decreased arsenic in the composition, the tendency to maintain the semiconductor material in its substantially disordered and short range order condition is not as strong so that when such a semiconductor material is switched to its conducting condition this tendency is overcome and the semiconductor material changes to the more ordered and long range order condition where it remains to provide current conduction in the memory type manner. However, when the current pulse is applied to switch the memory device back to its blocking condition, the more ordered and long range order condition is broken up, and the arsenic causes the semiconductor material to reassume its substantially disordered and short range order condition.

Extremely satisfactory results are obtained in the nonmemory- and memory-type switching operations utilizing the aforementioned arsenic-silicon systems, with or without cadmium, and also in such systems where germanium is substituted for silicon, and further where zinc is substituted for the cadmium in the arsenic-silicon-cadmium or the arsenic-germanium-cadmium system. Switching may also be obtained in any of these systems where phosphorous is substituted for the arsenic. Generally speaking, the proportions of the elements in such substituted systems will be substantially similar to those for the arsenic-silicon and the arsenic-silicon-cadmium systems described above. Switching further may be obtained where gallium or boron or aluminum are substituted for the silicon or germanium in the above described systems. Here, however, the atomic percent of the arsenic with respect to the gallium or boron or aluminum is about 50 percent.

As expressed above, the semiconductor materials which are engaged by the electrodes may be in the form of thick bodies or they may be in the form of thin layers of films. In making thick body semiconductor materials, appropriate amounts of the constituent elements or ingredients may be heated in a suitable closed vessel to a condition where the ingredients are a molten mass and agitated for uniformity of the mass. The mass may then be cooled to form an ingot and desired shapes of the semiconductor material may be cut or otherwise removed from the ingot. Alternatively, the semiconductor materials may be cast from the molten mass. Further, the ingots may be particlized by grinding or milling or the like to provide fine particles or a powder of the semiconductor material which may be pressed into pellets of desired configuration.

In making thin layers or films, fine particles or a powder of the semiconductor material, obtained from an ingot of the semiconductor material as stated above, may be dispersed in a suitable carrier, such as, paint or ink or the like, and deposited on a suitable substrate by brushing, silk screening or the like. Thin layers or films may also be formed by sputtering the semiconductor material onto a substrate from an ingot of the semiconductor or by cosputtering the constituent elements or ingredients themselves onto the substrate. When the thin layers or films are so formed by sputtering, the semiconductor material therein has a substantially amorphous structure.

The electrodes may be made to contact the semiconductor materials in various ways. They may be mechanically pressed in contact therewith, they may be hot pressed into the semiconductor material, and they may be deposited thereon by vacuum deposition, sputtering, or deposition from a solution or the like. Alternatively, the semiconductor material may be deposited on the electrodes by brushing, silk screening, sputtering or the like. The electrodes should be good electrical conductors and should not react unfavorably with the semiconductor material. As for example, the electrodes may comprise refractory metals, such as, tungsten, tantalum, molybdenum, columbium or the like, or metals, such as, stainless steel, nickel, chromium or the like.

While for purposes of illustration one form of this invention has been disclosed, other forms thereof may become apparent to those skilled in the art upon reference to this disclosure and, therefore, this invention is to be limited only by the scope of the appended claims.

We claim:

1. A current controlling device for an electrical circuit including a semiconductor material and electrodes in contact therewith, wherein said semiconductor material has a high electrical resistance to provide a blocking condition for substantially blocking current therethrough, wherein said high electrical resistance in response to a voltage above a threshold voltage value substantially instantaneously decreases in at least one path between the electrodes to a low electrical resistance which is orders of magnitude lower than the high electrical resistance to provide a conducting condition for conducting current therethrough, and wherein the semiconductor material in the low electrical resistance conducting condition has a voltage drop which is a fraction of the voltage drop in the high electrical resistance blocking condition near the threshold voltage value, the improvement wherein said semiconductor material is a substantially disordered nonchalcogenide binary material including as one essential element arsenic or phosphorous and as another essential element silicon, germanium, gallium, boron or aluminum.

2. The current controlling device as defined in claim 1 wherein the atomic percent of said one essential element is within the range of substantially 66 2/3 percent and substantially 50 percent.

3. The current controlling device as defined in claim 1 wherein said one essential element is arsenic.

4. The current controlling device as defined in claim 1 wherein said other essential element is silicon.

5. The current controlling device as defined in claim 1 wherein said other essential element is germanium.

6. The current controlling device as defined in claim 3 wherein said other essential element is silicon.

7. The current controlling device as defined in claim 3 wherein said other essential element is germanium.

8. The current controlling device as defined in claim 1 wherein said one essential element is phosphorous and said other essential element is silicon.

9. The current controlling device as defined in claim 2 wherein said one essential element is arsenic.

10. The current controlling device as defined in claim 2 wherein said other essential element is silicon.

11. The current controlling device as defined in claim 2 wherein said other essential element is germanium.

12. The current controlling device as defined in claim 9 wherein said other essential element is silicon. The current controlling device as defined in claim 9 wherein said other essential element is germanium.

14. The current controlling device as defined in claim 2 herein said one essential element is phosphorous and said other essential element is silicon.